(12) United States Patent
Yagasaki et al.

(10) Patent No.: US 9,334,923 B2
(45) Date of Patent: May 10, 2016

(54) METAL BELT FOR CONTINUOUSLY VARIABLE TRANSMISSION

(71) Applicant: HONDA MOTOR CO., LTD., Tokyo (JP)

(72) Inventors: Toru Yagasaki, Wako (JP); Soichiro Sumida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/666,575

(22) Filed: Mar. 24, 2015

(65) Prior Publication Data

US 2015/0276016 A1 Oct. 1, 2015

(30) Foreign Application Priority Data

Mar. 31, 2014 (JP) ................................. 2014-072895

(51) Int. Cl.
  *F16G 1/21* (2006.01)
  *F16G 1/22* (2006.01)
  *F16G 5/16* (2006.01)

(52) U.S. Cl.
  CPC ....................... *F16G 5/16* (2013.01)

(58) Field of Classification Search
  CPC ..... F16G 5/16; Y10T 29/49863; B21D 53/14; C21D 1/30; C21D 9/0068
  USPC ......................................... 474/242
  See application file for complete search history.

(56) References Cited

U.S. PATENT DOCUMENTS

| 7,846,049 B2* | 12/2010 | Kanehara | F16G 5/16 474/201 |
| 8,490,266 B2* | 7/2013 | Kobayashi | F16G 5/16 156/137 |
| 2001/0039225 A1* | 11/2001 | Kanehara | F16G 5/16 474/242 |
| 2001/0051554 A1* | 12/2001 | Kanehara | F16G 5/16 474/242 |
| 2002/0025871 A1* | 2/2002 | Fujioka | F16G 5/16 474/242 |
| 2002/0128103 A1* | 9/2002 | Brandsma | F16G 5/16 474/242 |
| 2002/0183152 A1* | 12/2002 | Kobayashi | F16G 5/163 474/242 |

(Continued)

FOREIGN PATENT DOCUMENTS

JP 2-37307 Y2 10/1990

*Primary Examiner* — Henry Liu
(74) *Attorney, Agent, or Firm* — Westerman, Hattori, Daniels & Adrian, LLP (57) ABSTRACT

A metal belt is wound around a drive pulley and a driven pulley of a continuously variable transmission. Since intervals between multiple adjuster metal element groups are set so as to avoid that the number of the adjuster metal element groups simultaneously existing on a driving-side chord portion of the metal belt between the drive pulley and the driven pulley is 2 or more, it is possible to prevent large vibration which would occur if two or more adjuster metal element groups would exist on the driving-side chord portion of the metal belt. Furthermore, since the multiple adjuster metal elements are distributionally disposed in the multiple adjuster metal element groups, it is possible to decrease imbalance among the adjuster metal element groups, compared with a case where all the adjuster metal elements are disposed in a single adjuster metal element group. Thereby, the vibration can be reduced more.

2 Claims, 8 Drawing Sheets

(56) References Cited

U.S. PATENT DOCUMENTS

| | | | |
|---|---|---|---|
| 2005/0170926 A1* | 8/2005 | Aoyama | F16G 5/16 474/237 |
| 2005/0176541 A1* | 8/2005 | Sattler | F16G 5/166 474/242 |
| 2006/0079366 A1* | 4/2006 | Kanehara | F16G 5/16 474/242 |
| 2006/0183587 A1* | 8/2006 | Kanehara | F16G 5/16 474/242 |
| 2008/0009378 A1* | 1/2008 | Kanehara | F16G 5/16 474/242 |
| 2009/0111633 A1* | 4/2009 | Yagasaki | F16G 5/16 474/242 |
| 2009/0280940 A1* | 11/2009 | Toyohara | F16G 5/16 474/242 |
| 2010/0227721 A1* | 9/2010 | Kato | F16G 5/16 474/242 |
| 2010/0311531 A1* | 12/2010 | Nishimi | F16G 5/16 474/242 |
| 2014/0106919 A1* | 4/2014 | Harima | F16G 5/16 474/242 |
| 2014/0221141 A1* | 8/2014 | Van Der Sluis | F16G 5/16 474/242 |
| 2015/0167781 A1* | 6/2015 | Nishida | F16G 5/16 148/238 |

* cited by examiner

| TOTAL NUMBER OF ADJUSTER METAL ELEMENTS | NUMBER OF ADJUSTER METAL ELEMENTS | | |
|---|---|---|---|
| | FIRST GROUP | SECOND GROUP | THIRD GROUP |
| 0 | – | – | – |
| 1 | 1 | – | – |
| 2 | 2 | – | – |
| 3 | 3 | – | – |
| 4 | 2 | 2 | – |
| 5 | 3 | 2 | – |
| 6 | 2 | 2 | 2 |
| 7 | 3 | 2 | 2 |
| 8 | 3 | 3 | 2 |
| 9 | 3 | 3 | 3 |
| 10 | 4 | 3 | 3 |
| 11 | 4 | 4 | 3 |
| 12 | 4 | 4 | 4 |
| 13 | 5 | 4 | 4 |
| 14 | 5 | 5 | 4 |

METAL BELT FOR CONTINUOUSLY VARIABLE TRANSMISSION

BACKGROUND OF THE INVENTION

1. Field of the Invention

The present invention relates to a metal belt for a continuously variable transmission, the metal belt being wound around a drive pulley and a driven pulley so as to transmit driving force, in which the metal belt includes a plurality of metal elements which are supported by a metal ring assembly, and in order to adjust gaps between the metal elements, a plurality of adjuster metal element groups are disposed on the metal belt at predetermined intervals, each of the adjuster metal element groups including at least two or more continuous adjuster metal elements whose thickness differs from that of the metal elements.

2. Description of the Related Art

Japanese Utility Model Publication No. 2-37307 has made publicly known a metal belt for a continuously variable transmission in which multiple metal elements (blocks) are supported by metal ring assemblies (hoops), and gaps between adjacent metal elements are adjusted by incorporating a predetermined number of adjuster metal elements, whose thickness differs from that of the metal elements, into the metal belt.

A problem with this metal belt for a continuously variable transmission is that if a width of the adjuster metal elements in a pulley axial direction is wider than a width of the metal elements in the pulley axial direction because of their variations which occur during manufacturing, the adjuster metal elements are pushed outward of the metal elements in a pulley radial direction; and large bending stress needs to be prevented from acting on part of the metal ring assemblies where the adjuster metal elements are pushed outward of the metal elements in the pulley radial direction. In order to solve the problem, the part of the metal ring assemblies acted on by the bending stress (in other words, the part of the metal ring assemblies where the adjuster metal elements are incorporated into the metal belt) is decreases in size by continuously disposing at least two or more adjuster metal elements on the metal belt. In addition, durability of the metal belt is enhanced by reducing a deformation amount of the part of the metal ring assemblies where the adjuster metal elements are incorporated into the metal belt.

Meanwhile, the metal elements and the adjuster metal elements, which differ from each other in thickness, not only differ from each other in weight, but also slightly differ from each other in shape, other than in thickness, because the metal elements and the adjuster metal elements are press-formed using different dies. It is inevitable that weight balance and shape balance slightly differ between a part of the metal belt corresponding to an adjuster metal element group where multiple adjuster metal elements are continuously disposed and the rest of the metal belt. As a result, a driving-side chord portion of the metal belt, which is situated between a drive pulley and a driven pulley, vibrates due to exciting force acting on the part of the metal belt corresponding to the adjuster metal element group so that noises and deterioration in power transmission efficiency may be caused.

A conceivable measure to avoid this is such that: the adjuster metal element group is divided into multiple adjuster metal element groups; the multiple adjuster metal element groups are disposed on the metal belt at predetermined intervals; and thereby, imbalance is reduced between the adjuster metal element groups. However, in this measure, intervals between the adjuster metal element groups become smaller so that a situation occurs in which some adjuster metal element groups exist on the driving-side chord portion at the same time, and a vibration condition of the metal belt may be compounded by exciting force applied to the multiple adjuster metal element groups against the intention to reduce the vibration of the metal belt.

SUMMARY OF THE INVENTION

The present invention has been made with the foregoing problem taken into consideration. An object of the present invention is to reduce vibration of a metal belt including multiple adjuster metal element groups.

In order to achieve the object, according to a first aspect of the present invention, there is provided a metal belt for a continuously variable transmission, the metal belt being wound around a drive pulley and a driven pulley so as to transmit driving force, in which the metal belt includes a plurality of metal elements which are supported by a metal ring assembly, and in order to adjust gaps between the metal elements, a plurality of adjuster metal element groups are disposed on the metal belt at predetermined intervals, each of the adjuster metal element groups including at least two or more continuous adjuster metal elements whose thickness differs from that of the metal elements, wherein the intervals between the plurality of adjuster metal element groups are set so as to avoid that the number of the adjuster metal element groups simultaneously existing on a driving-side chord portion of the metal belt between the drive pulley and the driven pulley is 2 or more.

According to the first aspect, the metal belt wound around the drive pulley and the driven pulley so as to transmit the driving force, includes the multiple metal elements which are supported by the metal ring assembly. For the purpose of adjusting gaps between the metal elements, the multiple adjuster metal element groups each including at least two continuous adjuster metal elements whose thickness differs from that of the metal elements are disposed on the metal belt at the predetermined intervals. For these reasons, even if a width of the adjuster metal elements in a pulley axial direction differs from a width of the metal elements in the pulley axial direction, it is possible to inhibit abrupt deformation in the pulley radial direction of parts of the metal ring assembly where the adjuster metal elements are disposed, and to decrease the number of parts of the metal ring assembly which is likely to be deformed in a radial direction. Thereby, durability of the metal belt can be enhanced.

In addition, the intervals between the multiple adjuster metal element groups are set so as to avoid that the number of the adjuster metal element groups simultaneously existing on the driving-side chord portion of the metal belt between the drive pulley and the driven pulley is 2 or more. For this reason, it is possible to prevent large vibration which would occur if two or more adjuster metal element groups would exist on the driving-side chord portion of the metal belt. Furthermore, since the multiple adjuster metal elements are distributionally disposed in the multiple adjuster metal element groups, it is possible to decrease imbalance among the adjuster metal element groups, compared with a case where all the adjuster metal elements are disposed in a single adjuster metal element group. Thereby, the vibration can be reduced more.

According to a second aspect of the present invention, in addition to the first aspect, the number of the adjuster metal element groups disposed on the metal belt is 3.

According to the second aspect, since the number of adjuster metal element groups disposed on the metal belt is 3, it is possible to securely avoid the situation where two or more adjuster metal element groups exist on the driving-side chord portion of the metal belt at the same time, and to limit the number of adjuster metal elements included in any adjuster metal element group to a minimum number. Thereby, the imbalance can be reduced.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention will be hereinbelow described on the basis of FIGS. 1 to 8.

Figure 1:
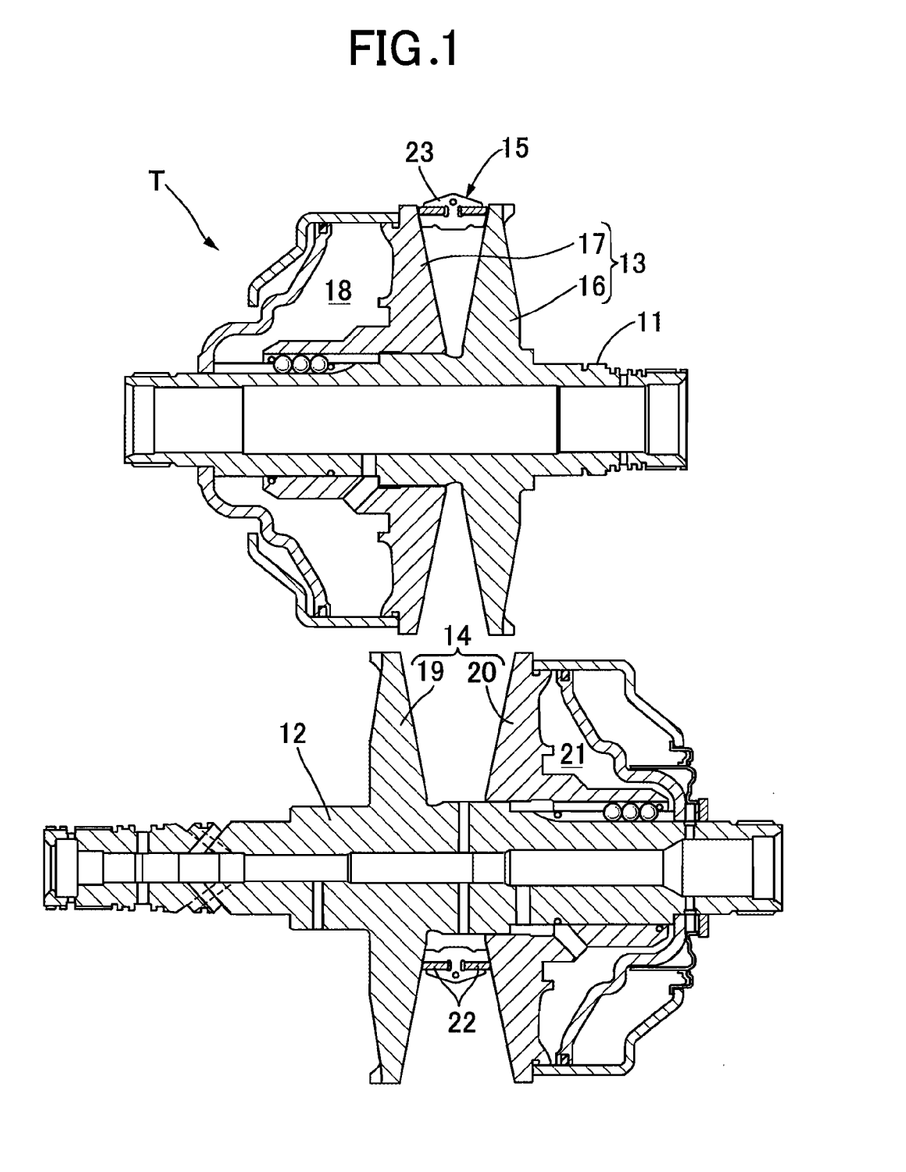
FIG. 1 is a view showing an overall configuration of a belt-type continuously variable transmission mechanism.

FIG. 1 schematically shows a configuration of a belt-type continuously variable transmission T which is installed in an automobile. The belt-type continuously variable transmission T includes: a driving shaft 11 connected to an engine; and a driven shaft 12 connected to driving wheels. An endless metal belt 15 is wound around a drive pulley 13 provided to the driving shaft 11 and a driven pulley 14 provided to the driven shaft 12. The drive pulley 13 includes: a fixed-side pulley half body 16 fixedly provided to the driving shaft 11; and a movable-side pulley half body 17 capable of contacting with and separating from the fixed-side pulley half body 16. The movable-side pulley half body 17 is biased toward the fixed-side pulley half body 16 by hydraulic pressure which acts on an oil chamber 18. The driven pulley 14 includes: a fixed-side pulley half body 19 fixedly provided to the driven shaft 12; and a movable-side pulley half body 20 capable of contacting with and separating from the fixed-side pulley half body 19. The movable-side pulley half body 20 is biased toward the fixed-side pulley half body 19 by hydraulic pressure which acts on an oil chamber 21.

Figure 2:
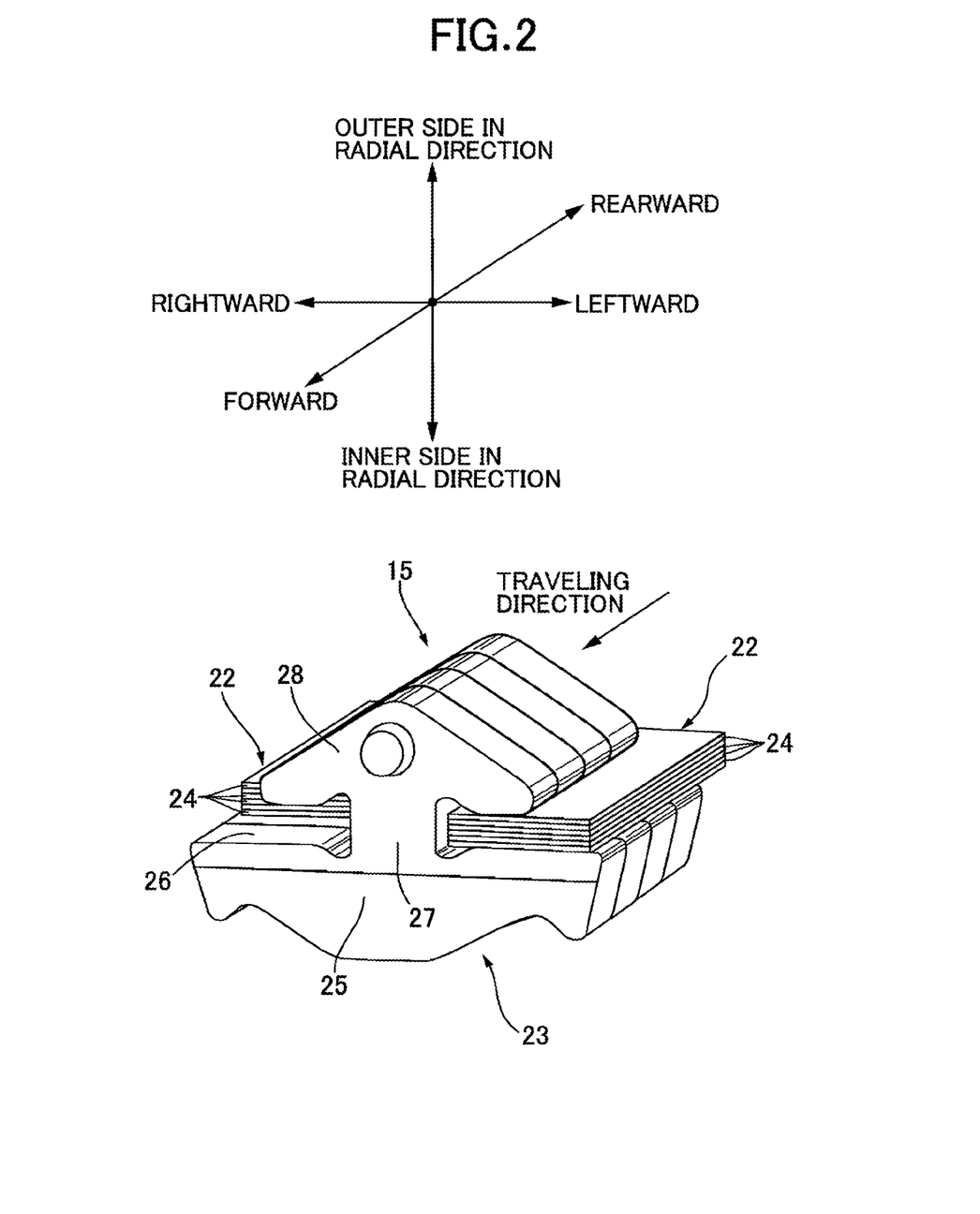
FIG. 2 is a partial perspective view of a metal belt.

As shown in FIG. 2, the metal belt 15 is formed from a pair of left and right metal ring assemblies 22 which support many metal elements 23. Each metal ring assembly 22 is formed from multiple stacked metal rings 24. Each metal elements 23 is blanked out from a metal plate material using a press die, and includes: an element body 25; a neck portion 27 situated between a pair of left and right ring slits 26 with which the respective metal ring assemblies 22 are in engagement; and an ear portion 28 having a substantially triangular shape, and connected to an radially outer side of the element body 25 via the neck portion 27.

Figure 3:
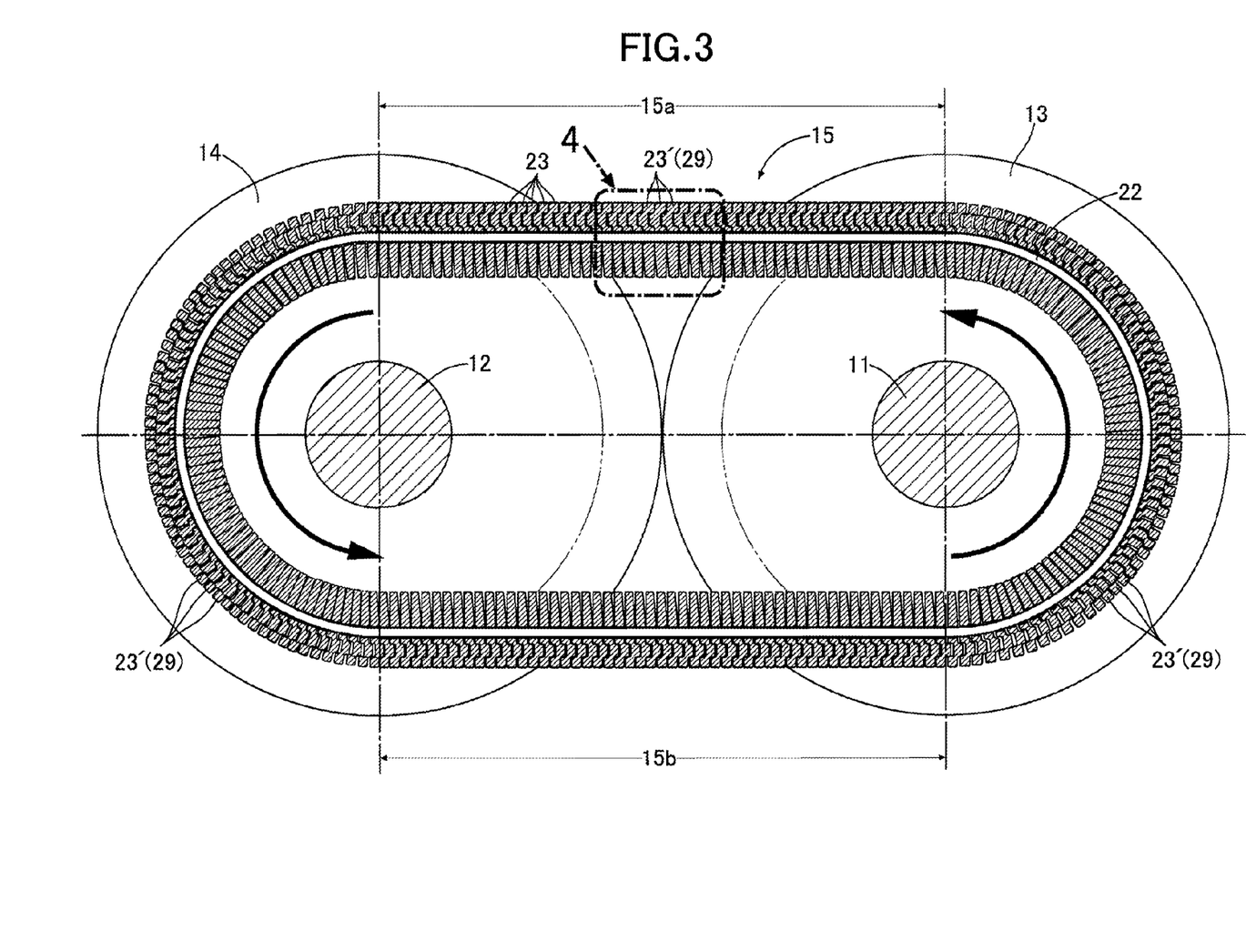
FIG. 3 is a view showing a state where the metal belt is wound around a drive pulley and a driven pulley.

As shown in FIG. 3, the metal belt 15 is wound around the drive pulley 13 and the driven pulley 14 which rotate respectively in directions indicated with arrows, and includes a driving-side chord portion 15a and a return-side chord portion 15b which extend linearly between the drive pulley 13 and the driven pulley 14. In the driving-side chord portion 15a, metal elements 23 adjacent to each other are in contact with each other, and their pushing force transmit driving force from the drive pulley 13 to the driven pulley 14.

FIG. 3 shows a MID-ratio condition where effective radii of the respective driving and driven pulleys 13, 14 are equal to each other. While in the MID-ratio condition, both the chord portions 15a, 15b are the longest. While getting into a LOW-ratio condition, the effective radius of the drive pulley 13 decreases and the effective radius of the driven pulley 14 increases, as well as both the chord portions 15a, 15b become slightly shorter. Conversely, while getting into an OD-ratio condition, the effective radius of the drive pulley 13 increases and the effective radius of the driven pulley 14 decreases, as well as both the chord portions 15a, 15b become slightly shorter.

Figure 4:
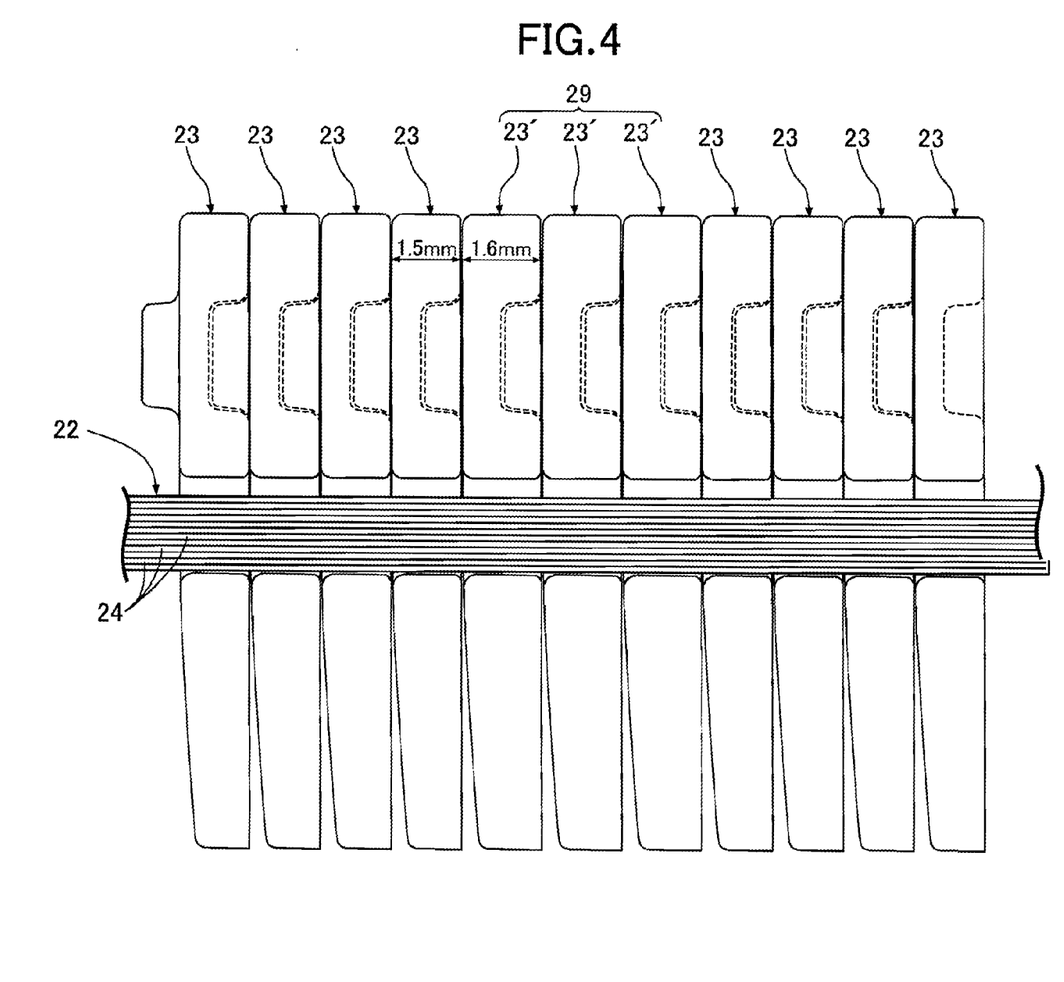
FIG. 4 is a view showing an adjuster metal element group on the metal belt.

As shown in FIG. 4, a predetermined number of continuous adjuster metal elements 23' are incorporated into the metal belt 15 for the purpose of adjusting gaps between multiple metal elements 23. The continuous adjuster metal elements 23' form one adjuster metal element group 29. The metal elements 23 and the adjuster metal elements 23' are basically identical in shape to each other, but are slightly different in thickness from each other.

In other words, because there are variations in total lengths of the respective metal ring assemblies 22 and thicknesses of the respective metal elements 23, gaps may occur between the multiple metal elements 23 when the metal elements 23 are combined with the metal ring assemblies 22. In a case where the metal elements 23 are, for example, 1.5 mm in thickness, if a gap of 1.5 mm is left when a last metal element 23 is going to be combined with the metal ring assemblies 22, this gap can be filled by combining the last metal element 23 with the metal ring assemblies 22.

If a gap of 0.1 mm is left in between when a last metal element 23 is going to be combined with the metal ring assemblies 22, this gap can be filled by combining one adjuster metal element 23' having a thickness of, for example, 1.6-mm, instead, therewith. If a gap of 0.2 mm is left in between, this gap can be filled by combining two adjuster metal elements 23' therewith. If a gap of 0.3 mm is left in between, this gap can be filled by combining three adjuster metal elements 23' therewith. Similarly, if a gap of 1.4 mm is left in between, this gap can be filled by combining 14 adjuster metal elements 23' therewith. In other words, in the case where each metal element 23 is 1.5 mm in thickness and each adjuster metal element 23' is 1.6 mm in thickness, the gap can be filled by combining no or up to 14 adjuster metal elements 23' therewith.

If the metal belt 15 includes two or more adjuster metal elements 23', durability of the metal ring assemblies 22 can be enhanced by consecutively placing the two or more adjuster metal elements 23', as discussed in Japanese Utility Model Publication No. 2-37307 given above. However, the adjuster metal elements 23' differ in thickness from the usual metal elements 23, and also the adjuster metal elements 23' are not free from slight difference in shape because of the difference among the press dies. For these reason, if the single adjuster metal element group 29 is formed by consecutively placing the multiple adjuster metal elements 23', part of the metal belt 15 corresponding to the adjuster metal element group 29 differs in physical properties (weight and shape) from the rest of the metal belt 15. This creates a problem that exciting force acts on the adjuster metal element group 29, particularly in the driving-side chord portion 15a from the drive pulley 13 to the driven pulley 14 so as to cause vibration in the metal belt 15. The reason for occurrence of the vibration in the driving-side chord portion 15a of the metal belt 15 is that the metal elements 23 or the adjuster metal elements 23' transmit the pushing force while getting into intimate contact with each other in the driving-side chord portion 15a, so that a slight difference in their shapes is magnified so as to deform the metal belt 15.

To avoid this, it is desirable that: the number of adjuster metal element groups 29 be increased; and the number of adjuster metal elements 23' to be included in each adjuster metal element group 29 be two or more, but as small as possible. Reduction in the number of adjuster metal elements 23' to be included in each adjuster metal element group 29 may be achieved by increasing the number of adjuster metal element groups 29. If, however, increase in the number of adjuster metal element groups 29 causes two adjuster metal element groups 29 to exist on the driving-side chord portion 15a between the drive pulley 13 and the driven pulley 14, the exciting force acts on the single driving-side chord portion 15a from the two adjuster metal element groups 29, and vibration accordingly increases against the intention of avoiding the occurrence of the vibration. Thus, a useless increase in the number of adjuster metal element groups 29 has an adverse effect.

If four or more adjuster metal element groups 29 are arranged on the metal belt 15 at equal intervals, a situation occurs in which two or more adjuster metal element groups 29 are present on the driving-side chord portion 15a at the same time. For this reason, the number of adjuster metal element groups 29 needs to be limited to three at maximum. As far as a general layout of the belt-type continuously variable transmission T shown in FIG. 4 is concerned, the arrangement of three or two adjuster metal element groups 29 on the metal belt 15 at equal intervals avoids occurrence of a situation in which the two or more adjuster metal element groups 29 are present on the driving-side chord portion 15a at the same time.

With the foregoing taken into consideration, the adjuster metal element groups 29 are formed based on the following criteria.

(1) The arrangement of one adjuster metal element 23' alone needs to be avoided as much as possible. Each adjuster metal element group 29 needs to be formed from two or more, but as few adjuster metal elements 23' as possible.

(2) The number of adjuster metal element groups 29 needs to be three or less, but as large as possible.

Figure 5:
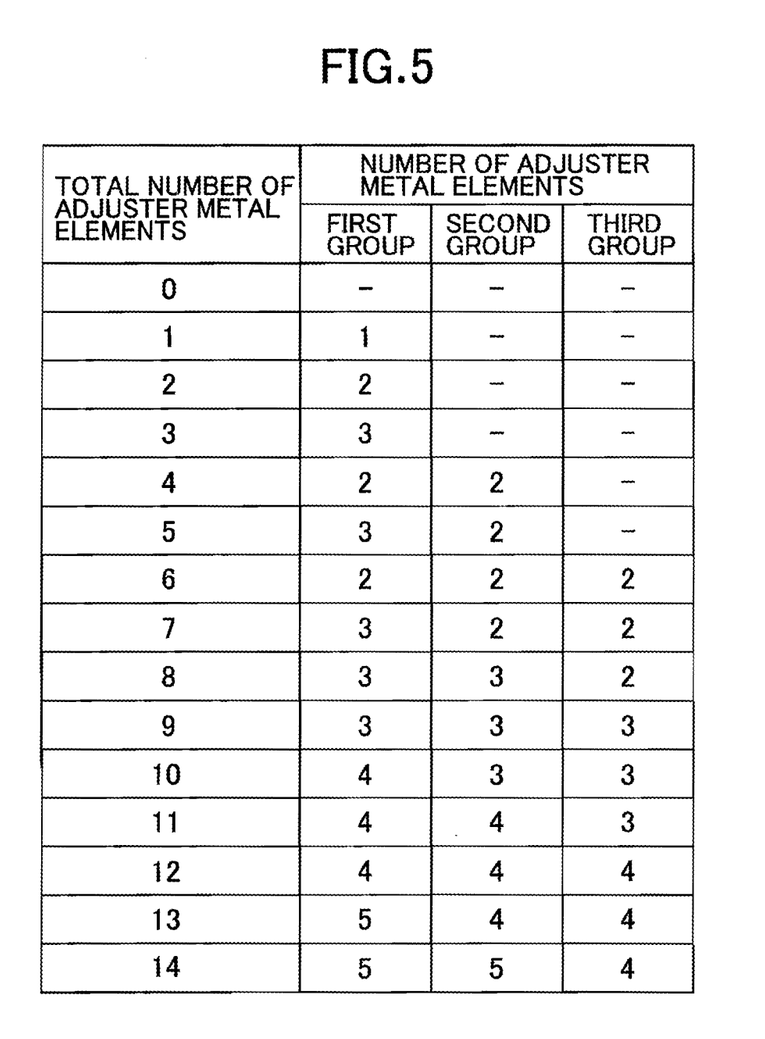
FIG. 5 is a table showing how many adjuster metal elements are allotted to each of three adjuster metal element groups.

The number of adjuster metal elements 23' is 0 or up to 14. The table in FIG. 5 shows configurations of the adjuster metal element groups 29 which are obtained based on the combination of the number of adjuster metal elements 23' with the above-discussed criteria.

Configuration cases will be reviewed as follows, with reference sign N denoting the total number of adjuster metal elements 23' to be included in the metal belt 15.

If N=0, no adjuster metal element group 29 is formed.
If N=1, one adjuster metal element group 29 is exceptionally formed from one adjuster metal element 23'.
If N=2, one adjuster metal element group 29 is formed from two adjuster metal elements 23'.
If N=3, one adjuster metal element group 29 is formed from three adjuster metal elements 23'.
If N=4, two adjuster metal element groups 29 each formed from two adjuster metal elements 23' are disposed at intervals of 180 degrees.
If N=5, one adjuster metal element group 29 formed from two adjuster metal elements 23', and one adjuster metal element group 29 formed from three adjuster metal elements 23' are disposed at intervals of 180 degrees.
If N=6, three adjuster metal element groups 29 each formed from two adjuster metal elements 23' are disposed at intervals of 120 degrees.
If N=7, two adjuster metal element groups 29 each formed from two adjuster metal elements 23', and one adjuster metal element group 29 formed from three adjuster metal elements 23' are disposed at intervals of 120 degrees.
If N=8, two adjuster metal element groups 29 each formed from three adjuster metal elements 23', and one adjuster metal element group 29 formed from two adjuster metal elements 23' are disposed at intervals of 120 degrees.
If N=9, three adjuster metal element groups 29 each formed from three adjuster metal elements 23' are disposed at intervals of 120 degrees.
If N=10, two adjuster metal element groups 29 each formed from three adjuster metal elements 23', and one adjuster metal element group 29 formed from four adjuster metal elements 23' are disposed at intervals of 120 degrees.
If N=11, two adjuster metal element groups 29 each formed from four adjuster metal elements 23', and one adjuster metal element group 29 formed from three adjuster metal elements 23' are disposed at intervals of 120 degrees.
If N=12, three adjuster metal element groups 29 each formed from four adjuster metal elements 23' are disposed at intervals of 120 degrees.
If N=13, two adjuster metal element groups 29 each formed from four adjuster metal elements 23', and one adjuster metal element group 29 formed from five adjuster metal elements 23' are disposed at intervals of 120 degrees.
If N=14, two adjuster metal element groups 29 each formed from five adjuster metal elements 23', and one adjuster metal element group 29 formed from four adjuster metal elements 23' are disposed at intervals of 120 degrees.

FIGS. 6A to 6D show respectively cases of one to four adjuster metal element groups 29 disposed on the metal belt 15. When the number of adjuster metal element groups 29 is two, the two adjuster metal element groups 29 are disposed on the metal belt 15 at intervals of 180 degrees. When the number of adjuster metal element groups 29 is three, the three adjuster metal element groups 29 are disposed on the metal belt 15 at intervals of 120 degrees. When the number of adjuster metal element groups 29 is four, the four adjuster metal element groups 29 are disposed on the metal belt 15 at intervals of 90 degrees.

Figure 6A:
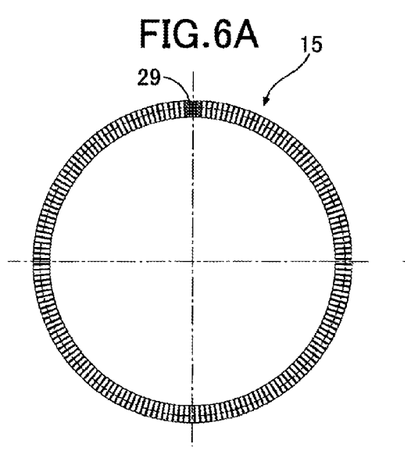
FIGS. 6A to 6D are views showing how an adjuster metal element group(s) is disposed on the metal belt.
Figure 6B:
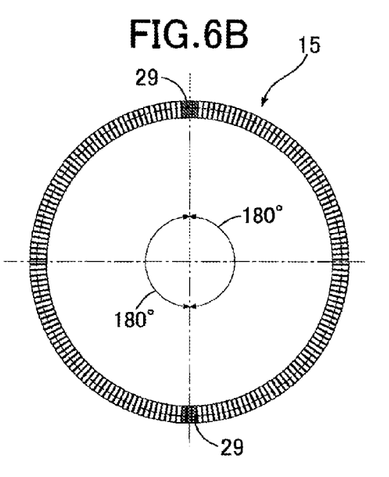
Figure 6C:
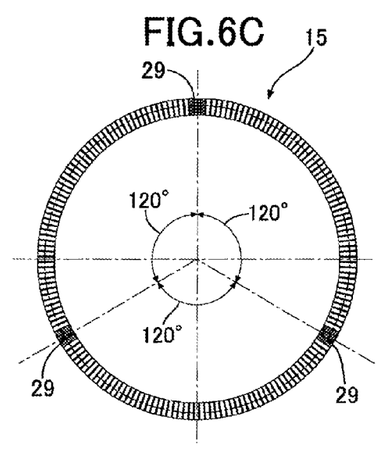
Figure 6D:
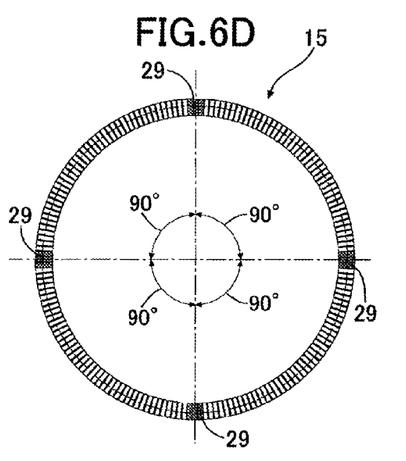

One of the prerequisites for the present invention is that there are multiple adjuster metal element groups 29. Thus, the case of one adjuster metal element group 29, which is shown in FIG. 6A, is not included in the present invention. In addition, the other of the prerequisites for the present invention is that two or more adjuster metal element groups 29 never exist on the driving-side chord portion 15a simultaneously. Thus, the case of four adjuster metal element groups 29, which is shown in FIG. 6D, is not included in the present invention. The reason for this is that if four or more adjuster metal element groups 29 are disposed on the metal belt 15 at equal intervals, two adjuster metal element groups 29 may exist on the driving-side chord portion 15a.

When based on the foregoing consideration, the adjuster metal element groups 29 are formed as shown in the table in FIG. 5, it is possible to avoid a situation where one adjuster metal element 23' is disposed alone, except for in the inevitable case, namely the case where the number of adjuster metal elements 23' is one; it is possible to limit the number of adjuster metal elements 23' included in any adjuster metal element group 29 to a minimum number which is two or more; and it is possible to limit the number of adjuster metal element groups 29 to the three at maximum, and accordingly to avoid a situation where two or more adjuster metal element groups 29 exist on the driving-side chord portion 15a at the same time.

Figure 7A:
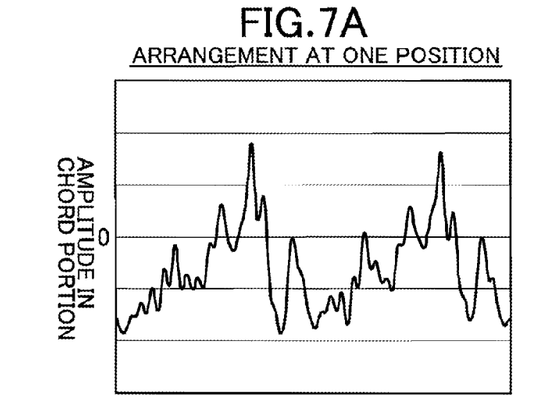
FIGS. 7A to 7D are graphs showing a relationship between the number of adjuster metal element groups and amplitude of vibration in a chord portion.
Figure 7B:
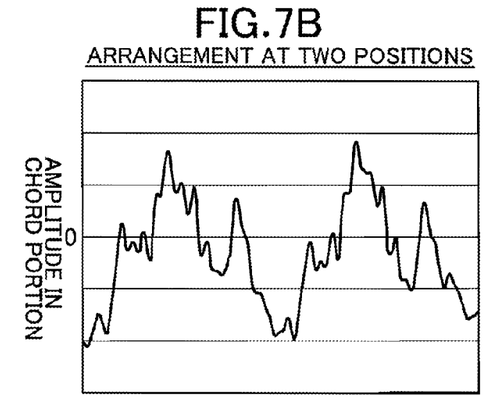
Figure 7C:
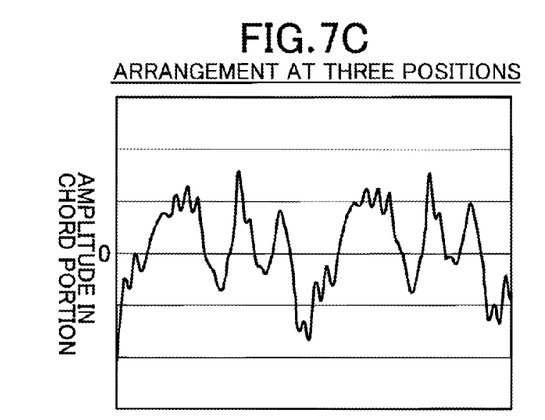

FIGS. 7A to 7D show amplitudes of vibrations at the center of the driving-side chord portion 15a of the metal belt 15. FIG. 7A corresponds to the case of one adjuster metal element group 29; FIG. 7B corresponds to the case of two adjuster metal element groups 29; FIG. 7C corresponds to the case of three adjuster metal element groups 29; and FIG. 7D corresponds to the case of four adjuster metal element groups 29.

Figure 7D:
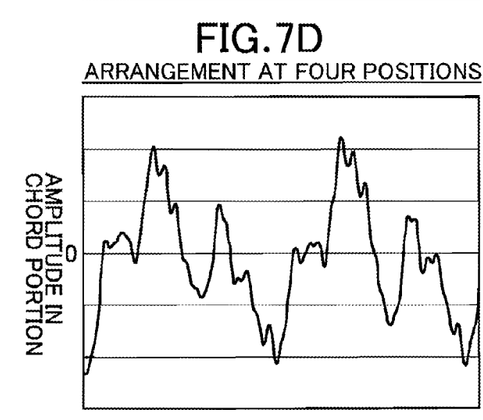
Figure 8:
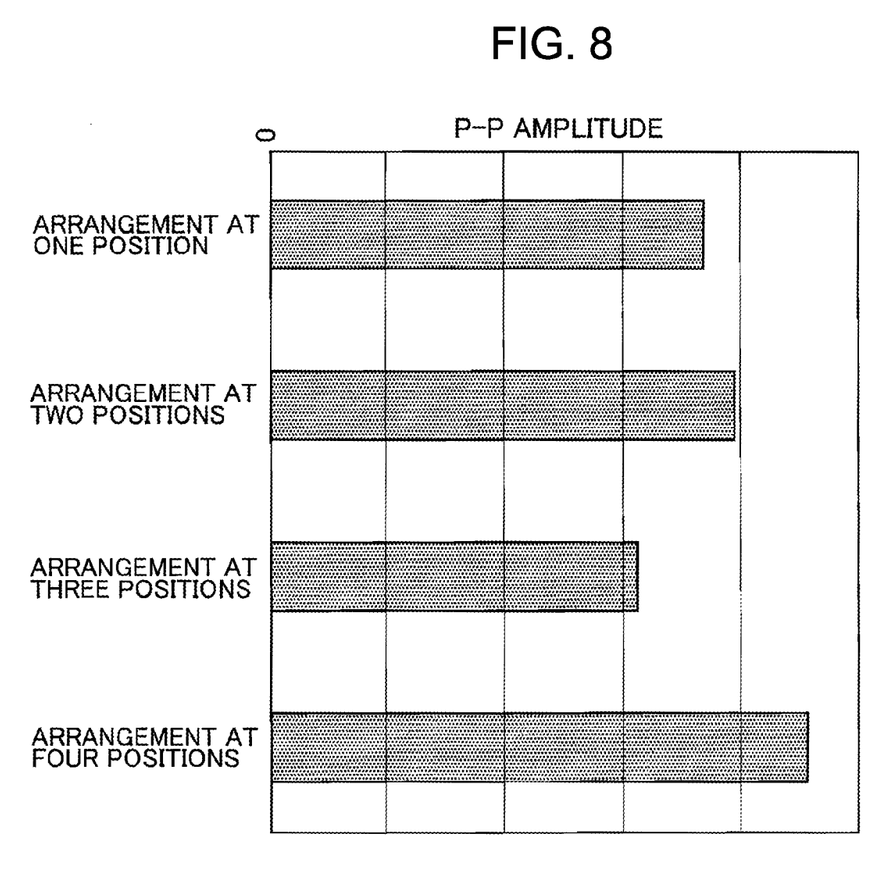
FIG. 8 is a graph showing peak-to-peak amplitudes of vibrations in FIGS. 7A to 7D.

Furthermore, FIG. 8 shows peak-to-peak (upper end-to-lower end) amplitudes of vibrations at the center of the driving-side chord portion 15a of the metal belt 15, which correspond to FIGS. 7A to 7D.

The amplitude is the smallest in the case of three adjuster metal element groups 29 in FIG. 7C. The amplitude is higher in the case of one adjuster metal element group 29 in FIG. 7A, and in the case of two adjuster metal element groups 29 in FIG. 7B, than in the case of three adjuster metal element groups 29 in FIG. 7C. The reason for this, one may consider, is that as the number of adjuster metal element groups 29 becomes smaller, the number of adjuster metal elements 23' included in any adjuster metal element group 29 becomes larger so as to increase the imbalance.

The amplitude is higher in the case of four adjuster metal element groups 29 in FIG. 7D than in the case of three adjuster metal element groups 29 in FIG. 7C. The reason for this, one may consider, is that: the case of four adjuster metal element groups 29 causes a situation where two adjuster metal element groups 29 exist on the driving-side chord portion 15a at the same time; before the vibration of the adjuster metal element group 29 previously entering the driving-side chord portion 15a ceases, the vibration of the adjuster metal element group 29 currently entering the driving-side chord portion 15a start; and thus, the two adjuster metal element groups 29 vibrate at the same time.

As described above, according to the embodiment, since an adjuster metal element group(s) 29 is disposed on the metal belt 15 so as to avoid that the number of adjuster metal element groups 29 simultaneously existing on the driving-side chord portion 15a of the metal belt 15 is 2 or more, it is possible to minimize the vibration of the metal belt 15, and accordingly to alleviate vibration and noise characteristics of the belt-type continuously variable transmission T. In order to avoid that the number of adjuster metal element groups 29 simultaneously existing on the driving-side chord portion 15a of the metal belt 15 is 2 or more, the number of adjuster metal element groups 29 on the metal belt 15 may be 1, 2 or 3. Meanwhile, as the number of adjuster metal element groups 29 becomes smaller, the number of adjuster metal elements 23' included in any adjuster metal element group 29 becomes larger so as to increase the imbalance. For this reason, it is possible to suppress the vibration of the metal belt 15 most effectively in the case of three adjuster metal element groups 29.

Although the foregoing descriptions have been provided for the embodiment of the present invention, various design modifications may be made to the present invention within a scope not departing from the gist of the present invention.

For example, neither the concrete numerical value of the thickness of the metal elements 23 nor the concrete numerical value of the thickness of the adjuster metal elements 23' is limited to its corresponding one shown in the embodiment.

Furthermore, in the case where multiple adjuster metal element groups 29 are disposed on the metal belt 15, they do not have to be disposed thereon at exactly equal intervals.

Moreover, the present invention is applicable regardless of the size (a peripheral length of the metal belt 15, and a distance between the driving shaft 11 and the driven shaft 12) of the belt-type continuously variable transmission T.

What is claimed is:

1. A metal belt for a continuously variable transmission, the metal belt being wound around a drive pulley and a driven pulley so as to transmit driving force, in which the metal belt includes a plurality of metal elements which are supported by a metal ring assembly, and in order to adjust gaps between the metal elements, a plurality of adjuster metal element groups are disposed on the metal belt at predetermined intervals, each of the adjuster metal element groups including at least two or more continuous adjuster metal elements whose thickness differs from that of the metal elements, wherein the intervals between the plurality of adjuster metal element groups are set so as to avoid that the number of the adjuster metal element groups simultaneously existing on a driving-side chord portion of the metal belt between the drive pulley and the driven pulley is 2 or more.

2. The metal belt for a continuously variable transmission according to claim 1, wherein the number of the adjuster metal element groups disposed on the metal belt is 3.

\* \* \* \* \*